United States Patent [19]
Zampiello et al.

[11] 4,108,553
[45] Aug. 22, 1978

[54] LASER GYROSCOPE DETECTOR AND PATH LENGTH CONTROL SYSTEM

[75] Inventors: Albert N. Zampiello, Boxboro, Mass.; Bradley J. Patch, Jr., Owego, N.Y.

[73] Assignee: Raytheon Company, Lexington, Mass.

[21] Appl. No.: 756,672

[22] Filed: Jan. 4, 1977

[51] Int. Cl.² .......................... G01B 9/02; G01P 9/00
[52] U.S. Cl. .............................................. 356/106 LR
[58] Field of Search ............. 356/106 LR; 331/94.5 S

[56] References Cited

U.S. PATENT DOCUMENTS

| | | | |
|---|---|---|---|
| 3,431,514 | 3/1969 | Oshman et al. | 331/94.5 S |
| 3,854,819 | 12/1974 | Andringa | 356/106 LR |
| 3,965,440 | 6/1976 | Graves | 331/94.5 S |

Primary Examiner—Vincent P. McGraw
Attorney, Agent, or Firm—John R. Inge; M. D. Bartlett; J. D. Pannone

[57] ABSTRACT

A four frequency laser gyroscope system having parallel processing of path length control and detection signals. Two output signal beams each containing components of two of the four waves circulating in the laser cavity are shone upon separate detector diodes. The output signals from the diodes contain both high and low frequency components which are separated in a crossover circuit. The low frequency component is processed to control the optical path length while the high frequency component is processed to produce a digital signal representing the amount of rotation of the laser gyroscope cavity.

14 Claims, 5 Drawing Figures

LASER GYROSCOPE DETECTOR AND PATH LENGTH CONTROL SYSTEM

BACKGROUND OF THE INVENTION

1. Field of the Invention.

The invention relates to laser gyroscope systems and particularly to such systems employing waves of four different frequencies within the laser gyro cavity.

2. Description of the Prior Art.

In general, laser gyroscopes devices have two or more waves traveling in opposite directions along a closed path including a laser gain medium so that rotation of the device about an axis within the path causes the path length for oppositely rotating waves to differ depending upon the rate of rotation. With a two wave or frequency system, it has been found that, for low rates of rotation corresponding to a small theoretical difference frequency, the actual output difference frequency is zero or substantially less than would be expected due to the phenomena known as lock-in. It is believed that the lock-in problem arises because of coupling between the waves which may arise from a number of possible factors including back scattering of laser energy from elements within the laser path such as mirrors or a polarization dispersive structure or from scattering centers within the laser gain medium itself.

The earliest attempts to compensate for this problem included one proposal in which the two beams are biased at zero rotation away from the zero output level by the use of a Faraday rotator which subjects beams propagating in different directions to different delay times. Unfortunately simply biasing the two beams sufficiently far apart to avoid lock-in produced a large frequency difference between the two beams, so large in fact that the change in frequency caused by ordinary amounts of rotation was rather insignificant compared to the total frequency difference. Thus, any small drift could obliterate the actual desired signal output. Further attempts to achieve biasing included one in which the Faraday rotator was switched from one direction to another using a symmetric AC switching waveform. Such systems have proven somewhat difficult to implement since the symmetry of the AC switching waveform had to be maintained to greater than one part in a million.

The most successful laser gyroscopes yet proposed and constructed employ four waves of two pairs or beams each propagating in opposite directions. Such systems are shown and described in U.S. Pat. Nos. 3,741,657 and 3,854,819 to Keimpe Andringa and assigned to the present assignee, the specifications of those patents being herein incorporated by reference. In such a laser system, circular polarization for the four waves is preferred. The pair of waves propagating in the clockwise direction includes both left and right hand circularly polarized waves as does the pair propagating in the counter clockwise direction.

Two biasing components are provided. A device such as a crystal rotator produces a delay for circularly polarized waves that is different in one sense or handedness of circular polarization than for the opposite sense and is also reciprocal. That is, a wave traveling in either direction through the crystal will be delayed by the same amount of time. Secondly, a device such as a Faraday rotator is also disposed in the wave path. Such a device is nonreciprocal providing a different time delay for the two directions of propagation. This is achieved by rotating the circular polarization vector by different angles. The delay is independent of the sense of polarization. The result of these biasing operations produces four waves, two with frequencies above the peak of the gain curve of the laser medium and two below. The two above may for example both be right-hand circularly polarized while the lower two are left-hand circularly polarized. At a zero rate of rotation, the frequency difference between the left-hand circularly polarized and the right-hand circularly polarized waves are equal. When, for example, the system is rotated in one direction the right-hand circularly polarized waves will move closer together in frequency while the left-hand circularly polarized waves will move apart. The opposite direction of rotation produces the opposite direction of change in frequencies. The actual rotation rate is readily related to the difference between the difference in right-hand circularly and left-hand circularly polarized wave pairs.

In the laser gyroscope systems disclosed in the referenced patents, a structure for adjusting the length of the path through which the four waves propagate to maintain the frequency pairs positioned symmetrically about the center maximum gain frequency of the laser gain medium curve is described. Such symmetric positioning is desired in order to minimize residual drift or lock-in effects.

It has been desired to provide output processing circuitry for determining both the rate or amount of rotation and for providing path length control. Previously known output processing circuit required matched gain amplifiers for providing path length control. The gains of two amplifiers had to be maintained within tight tolerance limits of each other over a wide range of temperature and environmental conditions thereby making such circuits both costly and complex.

In other known prior art systems a great deal of power was wasted or used inefficiently in the output processing circuitry.

Accordingly, it is an object of the present invention to provide a laser gyroscope system having efficient and economical processing of output signal data.

It is also an object of the present invention to provide such a laser gyroscope system in which path length control is achieved without the use of matched gain amplifiers.

Furthermore, it is an object of the invention to provide a laser gyroscope system which requires a minimum amount of power to be extracted from the wave path for operation of the output and path control circuitry.

SUMMARY OF THE INVENTION

These, as well as other objects of the invention, are met by providing a laser gyroscope cavity including a laser gain medium positioned in a re-entrant path with a plurality of waves each of a different frequency propagating within the closed path, one or more detecting means with at least two of the waves being coupled to each of the detecting means, and first and second filtering means coupled to each of the detecting means with each of the first filtering means having a passband below a predetermined frequency and each second filtering means having a passband above that frequency. Further, there may be provided means for adjusting the length of the closed path in response to at least one output of each of the first filtering means. The adjusting means may include a piezoelectric transducer while the filtering means may each include an amplifier. The combination may also include means for producing an output count representing the amount of rotation of the laser gyroscope cavity in response to at least one output of each of the second filtering means. The predetermined frequency is preferably below the minimum output signal frequency representing rotation produced by rotation of the laser gyroscope cavity.

The invention may also be practiced by the combination of a laser gyroscope cavity having a closed path for propagation of at least four electromagnetic waves with each being of a different frequency, first and second detecting means with a first two of the waves being coupled optically to the first detecting means and a second two of the waves being coupled optically to the second detecting means, first and second signal filtering means coupled to each of the detecting means with the first signal filtering means having a passband below a predetermined frequency and the second signal filtering means having a passband above the predetermined frequency, means for adjusting the length of the path of the laser gyroscope in response to outputs of the first filtering means coupled to the first and second detecting means, and means for producing an output signal indicative of the rate or amount of rotation of the laser gyroscope cavity in response to outputs of the second filtering means coupled to the first and second detecting means. The predetermined frequency is again preferably below the minimum output signal frequency from either one of the second filtering means produced by rotation of the laser gyroscope cavity. Both the first and second filtering means may each comprise an amplifier which may have its passband determined at least partially by feedback elements coupled around the amplifier. The path length adjusting means may include a signal repesentative of the difference in amplitude between the output of the first filtering means coupled to the first detecting means and the output of the first filtering means coupled to the second detecting means and means for positioning reflecting means disposed in the path of the waves in response to the signal representing the difference in average amplitude between the two signals. The positioning means is preferably a piezoelectric transducer. The means for producing an output signal indicative of the rate of rotation of the laser gyroscope may include means for producing a first pulse stream in response to the output of the second filtering means coupled to the first detecting means and means for producing a second pulse stream in response to the output of the second filtering means coupled to the second detecting means. The means for producing the first and second pulse streams is preferably an amplifier with a Schmitt trigger circuit coupled to the output thereof. Further there may be provided means for producing a count output in response to the difference in frequency between the first and second pulse streams.

DESCRIPTION OF THE PREFERRED EMBODIMENTS

Figure 1:
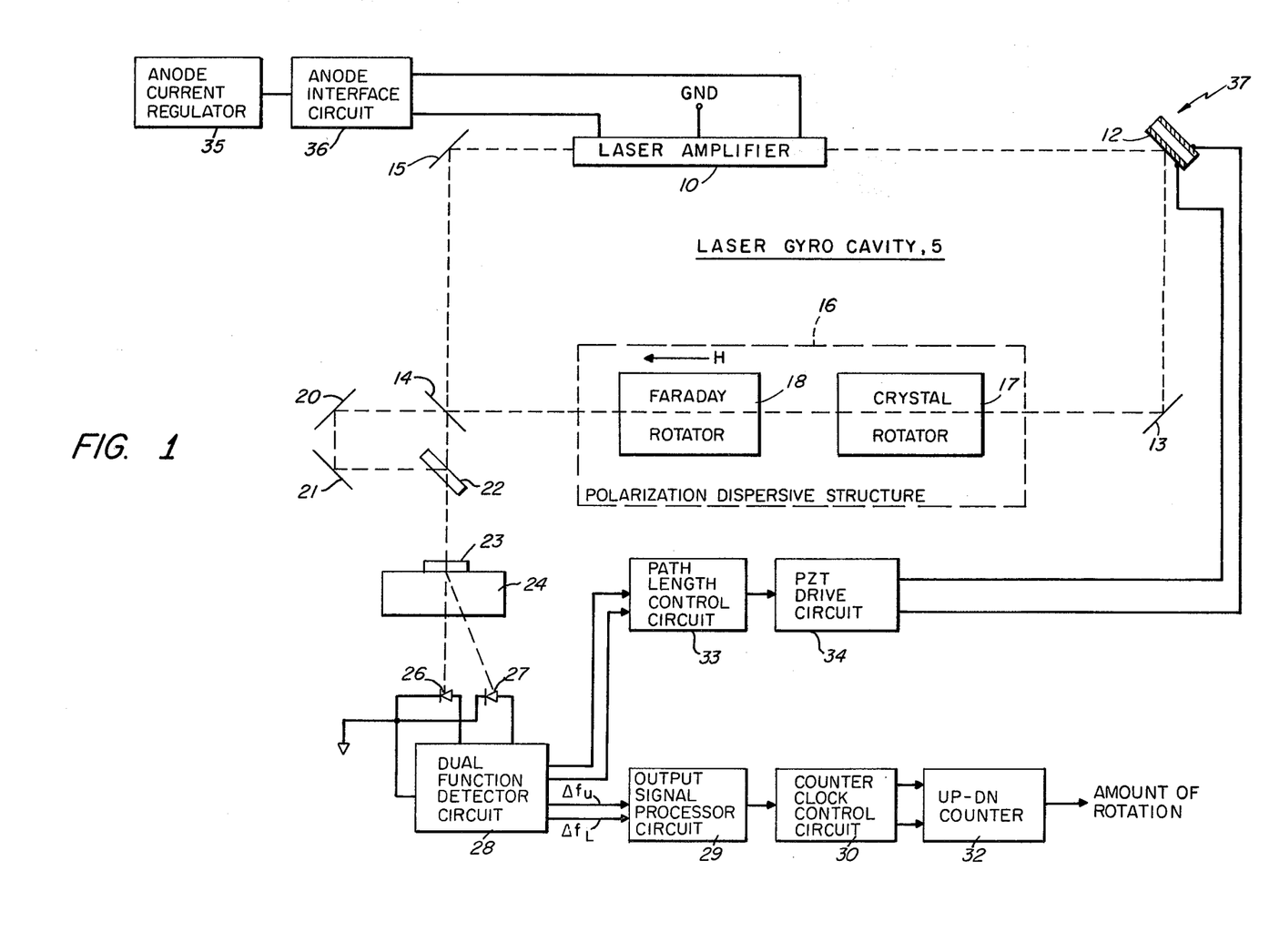
FIG. 1 is a block diagram of a laser gyroscope system in which the present invention is used to advantage.
Figure 3:
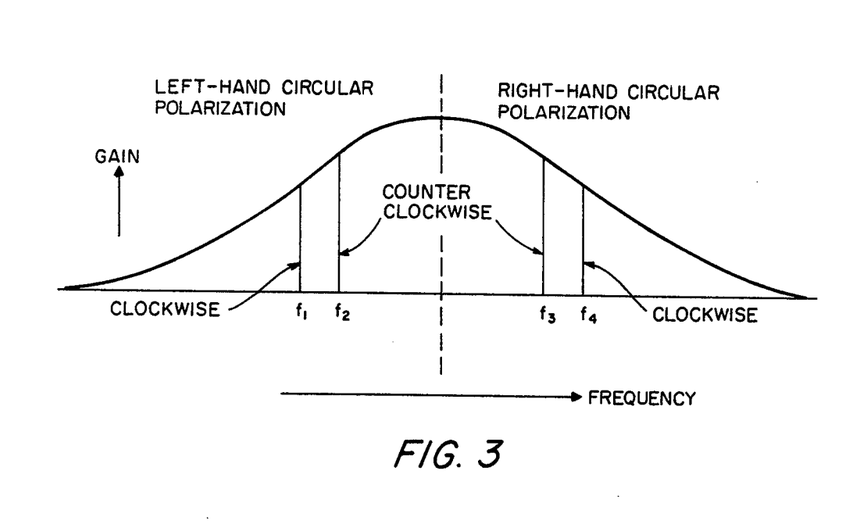
FIG. 3 shows a laser medium gain curve with the positions of the frequencies of the four waves indicated thereon.

Referring first to FIG. 1 there is shown a block diagram of a laser gyroscope system constructed in accordance with the teachings of the present invention. Laser gyro cavity 5 operates in the manner described in the incorporated patents and in the manner described above in the Background of the Invention. Laser gyro cavity 5 includes a closed or re-entrant path along which electromagnetic laser waves may propagate. The path includes laser amplifier 10, mirrors 12 and 13, polarization dispersive structure 16 including crystal rotator 17 and Faraday rotator 18, partially reflecting mirror 14, and mirror 15. Because of the biases produced by crystal rotator 17 and Faraday rotator 18, there are four waves of frequencies $f_1$–$f_4$. Waves of frequency $f_1$ and $f_4$ circulate in the clockwise direction while waves of frequency $f_2$ and $f_3$ circulate in the counterclockwise direction. All four waves are preferably circularly polarized with waves of frequencies $f_1$ and $f_2$ being left-hand circularly polarized with waves of frequencies $f_3$ and $f_4$ being right-hand circularly polarized. The positions upon the gain curve for the laser gain medium of laser amplifier 10 are shown graphically in FIG. 3.

A portion of each of the four waves is coupled out of the laser gyro 5 through partially transmitting mirror 14. Partially transmitting mirror 14 may preferably be a dielectric mirror through which may pass a small portion of the energy of the incident waves. Typically, one-half percent may be utilized. The beam emerging from the back side of partially transmitting mirror 14 in the vertical direction as shown in FIG. 1 is shone directly upon the upper surface of beam splitter 22. The second beam emerging from the back side of partially transmitting mirror 14 in the horizontal direction is reflected by mirrors 20 and 21 back through the lower surface of beam splitter 22 to the same spot on the upper surface of beam splitter 22 on which is shone the vertical wave. A single beam is produced which contains waves of all four frequencies. This beam is shone downwards to the output optic structure including quarter-wave plate 23 and calcite crystal 24. Quarter-wave plate 23 converts the two right-hand circularly polarized waves to linear polarization, for example in the vertical direction, and left-hand circularly polarized waves to linear polarization, for example in the horizontal direction. Because of its anisotropic nature, calcite crystal 24 subjects incoming waves of horizontal and vertical polarization to different delays. The propagation paths for waves of horizontal and vertical polarization are then different so that incoming beams of horizontal and vertical polarization striking the upper surface of calcite crystal 24 in the same spot and at the same angle emerge from the lower side of the crystal at different positions.

The two beams emerging from calcite crystal 24 are shown respectively on detectors 26 and 27. The beam shone upon detector 26 is of vertical polarization corresponding to the two right-hand circularly polarized waves of frequencies $f_3$ and $f_4$ while the beam shown upon detector diode 27 is of horizontal polarization corresponding to the left-hand circularly polarized waves of frequencies $f_1$ and $f_2$.

Because of their non-linear characteristics, detector diodes 26 and 27 produce output components representing the difference in the frequency of the two waves incident upon each diode. There is also produced across each diode a DC or low frequency component or current representing the sum of the amplitudes of the two beams incident upon the diode.

Figure 4A:
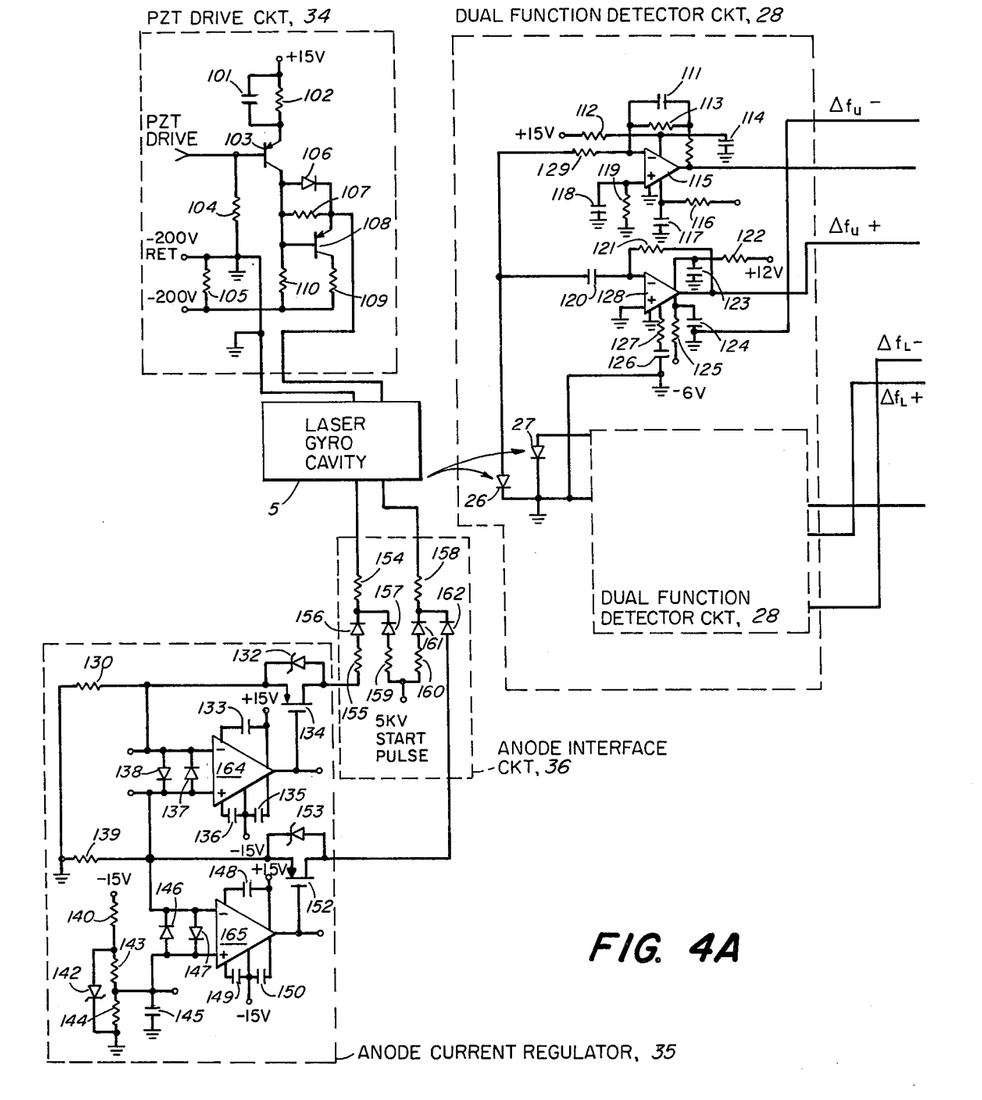
FIGS. 4A and 4B taken together are a schematic diagram of the output circuitry portions of the laser gyroscope system shown in FIG. 1.
Figure 4B:
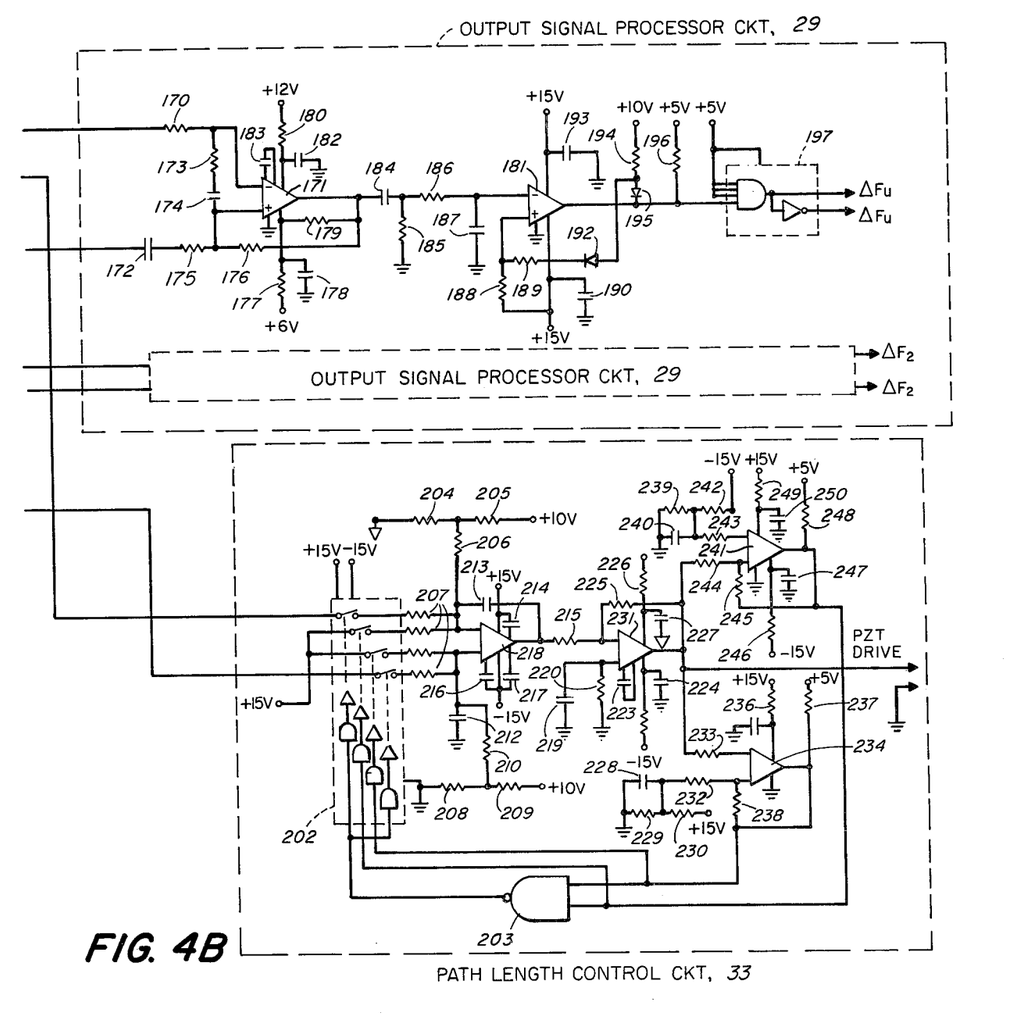

Dual function detection circuit 28 separates the outputs of diodes 26 and 27 into high and low frequency components in a particularly efficient manner to be described in conjunction with FIGS. 4A and 4B. Two high frequency signals are produced $\Delta f_u = f_4 - f_3$ and $\Delta F_l = f_2 - f_1$ representing respectively the difference between the frequencies of the upper or right-hand circularly polarized waves and the lower or left-hand circularly polarized waves. Two low frequency components are also produced representing respectively the sum of the average amplitudes of the right and left-hand circularly polarized waves.

The two low frequency components are coupled to path length control circuit 33 and piezoelectric drive circuit 34. The former circuit determines the difference between the average of two voltages which the latter amplifies the resulting difference to produce a drive signal for operation of piezoelectric transducer 37. Piezoelectric transducer 37 moves mirror 12 inward or outward as required to maintain the desired total path length and hence the position of the frequencies of the four waves upon the laser medium gain curve.

The upper and lower frequency difference signals produced by dual function detector circuit 28 are coupled to output signal processor circuit 29. These signals are in the form of a sinusoidal or approximately sinusoidal waveform at this point. They are converted by output signal processor circuit 29 to two digital pulse streams with one pulse produced for each cycle within the incoming voltage waveforms.

The two pulse streams are converted to a digital number representing the total amount of rotation from a predetermined time by counter clock control circuit 30 and up-down counter 32. These two circuits together function to provide a count equal to the difference between the frequency differences, that is, $(f_4 - f_3) - (f_2 - f_1)$. To accomplish this, function, up-down counter 32 is advanced by one count for each pulse in the $\Delta F_u$ pulse stream and decremented by one count for every pulse in the $\Delta F_l$ pulse stream. A commercial unit including both counter clock control circuit 30 and up-down counter 32 is available from FINC Electronics Company, Cambridge, Mass., as Model No. 8271C.

Anode current regulator 35 and anode interface circuit 36 provide the high voltage at constant current required for operation of laser amplifier 10. Also provided is a start pulse required for initiating the gas discharge of the laser gain medium.

Referring next to FIGS. 4A and 4B taken together there is shown a schematic diagram of dual function detector circuit 28, output signal processor circuit 29, path length control circuit 33, PZT drive circuit 34, anode current regulator 35, and anode interface circuit 36. The operation of dual function detector circuit 28 will be described first.

The anode of each of diodes 26 and 27 is coupled to two separate amplifiers 115 and 128. The signal from diode 26 is resistively coupled through resistor 129 to amplifier 115 to maintain the low frequency component of the output signal from the diode. The bandpass of amplifier 115, as determined by the values of resistors 113 and 129 and capacitor 111, extends from DC to a predetermined frequency above the maximum signal frequency required for operation of the piezoelectric transducer but below the minimum frequency difference output for the largest expected rate of rotation of the laser gyroscope cavity 5. The high frequency portion of the output signal from the diode, which is a sinusoid having a frequency which is equal to the difference between the frequencies of two of the two waves incident upon the diode, is capacitively coupled through capacitor 120 to the input of amplifier 128. The passband of amplifier 128, as determined by the values of resistor 121 and capacitor 120, commences at approximately the same predetermined frequency as the upper frequency limit of the passband of amplifier 115. Resistor 119, bypassed for high frequencies by capacitor 118, provides a minimum DC offset in the output of amplifier 115. Resistor 127 and capacitor 126 provide gain stability for amplifier 128.

Figure 2:
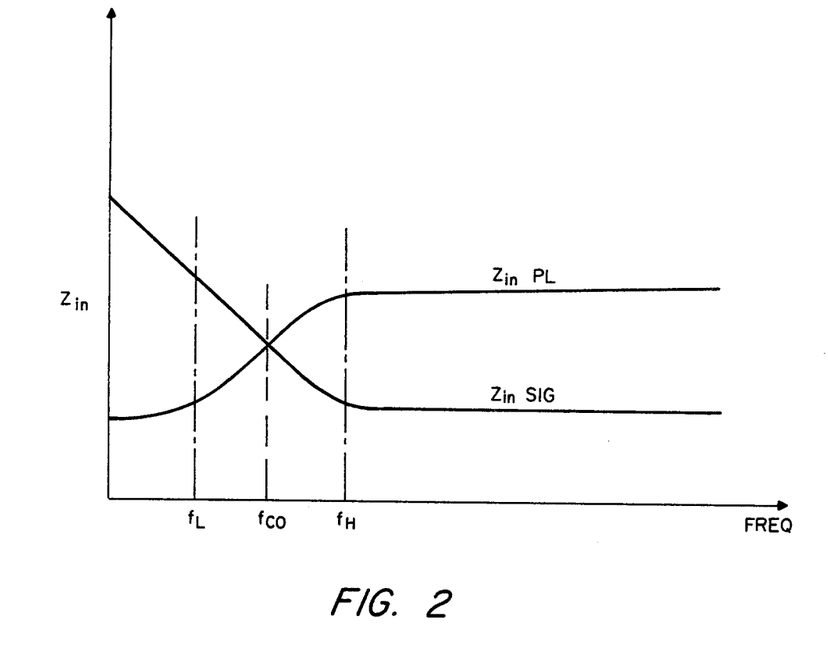
FIG. 2 is a plot of the input impedance of two amplifier circuits of the dual function detector circuit shown in FIG. 1.

The input impedances of amplifiers 115 and 128 are shown graphically in FIG. 2 for the frequency range of interest. The input impedance of amplifier 115 is low for low frequencies rising to a high level beyond crossover frequency $f_{co}$. The input impedance of amplifier 128, on the other hand, falls from a high value at low frequencies to a low value at higher frequencies crossing the input impedance of amplifier 115 at $f_{co}$. The total impedance presented to each diode is thus substantially constant over the frequency range of interest.

The presently described circuitry is more efficient than that of the prior art for a number of reasons. First, nearly all the low frequency photocurrent flows only into amplifier 115 and nearly all the high frequency photocurrent from the diode flows only into amplifier 128 because of the coupling and input impedance chosen. Almost no current flows into an amplifier where it is not being utilized. Essentially all the signal power produced by the optical input waves at the photodiode is utilized within the circuitry to the maximum extent possible. The need for signal processing electronics including amplifiers with gains matched over the entire signal bandwidth is eliminated minimizing the effect of gain errors on path length control. Also, since the separation of the two signals is achieved directly at the output of the diodes, the frequency response characteristics of the signal processing circuit and path length control circuits can be determined independently from one another.

The analog sinusoidal waveform at the output of amplifier 128 is converted to a digital stream of pulses by output signal processor circuit 29. The ground terminal from dual function detector circuit 28 is coupled through resistor 170 to the negative input of amplifier 171. The separate ground connection is maintained to permit remote location of dual function detector circuit 28 and output signal processor circuit 29 to eliminate current flow caused by differences between ground potentials of the two circuits. The output of amplifier 128 is coupled through capacitor 172 and 175 to the positive or non-inverting terminal of amplifier 171. The bandpass of amplifier 171 should be at least as wide as the bandpass of the incoming signal. The gain of amplifier 171 is determined by resistor 176 and is set sufficiently high to operate the succeeding circuit.

The amplified output from amplifier 171 is coupled through capacitor 184 and resistor 186 to the noninverting terminal of comparator 181 which is connected in a Schmitt trigger configuration. A positive feedback path including diodes 192 and 195 and resistors 188 and 189 provides the Schmitt trigger action so that the input sinusoid is converted to a square or rectangular wave output. Line driver 197 provides further amplification and buffering of the square wave output.

The low frequency component produced at the output of amplifier 115 is coupled to path length control circuit 33. A similar connection is made from the identical circuit coupled to diode 27. During normal circuit operation, solid state FET switch 202 couples the two low frequency signal inputs through the outer two of resistors 207 to the inverting and non-inverting terminals of amplifier 218. The connections to the plus 15 volt supply are then left open.

Amplifier 218 is connected with feedback capacitor 213 as a differential integrator. That is, the output of amplifier 218 will represent the integral of the difference between the two input signals. This integral, once properly amplified and impedance converted, provides the requisite drive for piezoelectric transducer 37. Amplifier 231, connected in a linear drive mode, provides part of this amplification.

As an integrator circuit may "latch up" or become saturated at either end of its voltage range at initial turn-on or because of system transients, it is desirable to provide some means for "unlatching" the integrator once the situation arises. Comparators 234 and 241 sense on one input of each the voltage at the output of amplifier 218. When the output exceeds in the positive direction or falls below in the negative direction the guard band voltage determined by the comparison voltages upon the second inputs of the comparator, the appropriate comparator output changes from a voltage representing logical one to a voltage representing logical zero. The comparison voltage is determined by dividers consisting of resistors 239 and 242 for comparators 241 and resistors 229 and 233 for comparator 234. Logic NAND gate produces a logical one voltage on its output in the case that either comparator output is in the zero state opening the connections from dual function detector circuit 28 through FET switch 202. Simultaneously, the comparator output causes +15V to be coupled, through one of resistors 20Fb or 20Fc to the appropriate input terminal of amplifier 218 forcing the integrator circuit out of the "latch-up" mode. When the "latch-up" condition no longer exists, the outputs of comparators 234 and 241 again assume the logical one state and the outputs from dual function detector circuit 28 are again coupled to the inputs of amplifier 218.

PZT drive circuit receives the output from amplifier 231, amplifies it, and provides a low impedance drive to piezoelectric transducer 37 which appears as a highly capacitive load. Transistor 103 is connected as a linear common emitter amplifier which provides drive to the base of transistor 108 which is operated in an emitter follower connection. The emitter follower circuit provides the low impedance and higher current required for driving the capacitive load of piezoelectric transducer 12.

A constant current of appropriate magnitude for maintaining the discharge required for operating laser amplifier 10 is provided by anode current regulator 35. Two equal and well-regulated currents are required, the first flowing through resistor 158 and the second through resistor 154 to the anodes of the discharge tube. A stable reference voltage is provided across Zener diode 142. This is divided down to a second reference voltage by resistors 143 and 144 connected across Zener diode 142. The second reference voltage is compared by differential amplifier 165 with the voltage sensed across resistor 139 through which flows the same current which flows through resistor 158. The output of diffferential amplifier adjusts the input voltage to FET transistor 152 varying the resistance between its source and drain and hence the amount of current flowing through it and resistors 139 and 158 with which it is in series thereby regulating the anode current.

A second circuit identical to the circuit for regulating the current through resistor 158 is provided for regulating the current through resistor 154 with the exception that the voltage across resistor 139 is taken as the reference voltage source. Any variations in the voltage across resistor 139 are reflected in the current output of the second circuit so that the two output currents are identical and track one another.

A 5 KV start pulse, produced at turn on for starting the discharge, is provided by an external circuit, not shown. This pulse is coupled through resistors 159 and 160 and diodes 157 and 160 to be added to the drive produced by anode current regulator 35. Diodes 156 and 162 provide protection and isolation of anode current regulator 35 from this pulse.

This completes the description of the preferred embodiments of the invention. Although preferred embodiments have been described, it is believed that numerous modifications and alterations thereto would be apparent to one having ordinary skill in the art without departing from the spirit and scope of the invention.

APPENDIX I

PARTS LIST FOR CIRCUITS OF FIGURES 4A and 4B 26, 27: matched pair diodes, E.G. and G. Inc. UV040B

Dual Function Detector Circuit

Integrated Circuits

115: Burr-Brown, Inc. 3521L
128: Fairchild μA702

Resistors 112, 116, 122, 125: 47Ω
113, 119: 5.1 MΩ
121: 200kΩ
127: 2KΩ

Capacitors

111: 150 pf
114, 117, 123, 124: 0.1 μf
118: 1μf
120: 0.039 μf
126: 200 pf

Output Signal Processor

Diodes

192: 1N4148
195: Hewlett-Packard HP5082-2835

Integrated Circuits

171: Fairchild μA 702
181: National Semiconductor LM319
197: National Semiconductor DM7830

Resistors 170, 173, 175, 179, 196: 2KΩ
176: 100 KΩ
177, 180: 51Ω
185: 5.1KΩ
186: 4.7KΩ

188: 10.7KΩ
189: 681Ω
194: 8.2 KΩ

Capacitors

172: 0.2μf
174: 100pf
178, 182, 190, 193: 0.01μf
183: 56 pf
184: 0.1μf
187: 10pf

Pathlength Control Circuit

Integrated Circuit

202: Siliconix, Inc. DG201C
203: Texas Instruments SN7400
218: Harris Semiconductor HA2900-8
231: National Semiconductor LM301
234, 241: National Semiconductor LH2211

Resistors 204, 205, 208, 209: 22KΩ
206, 210: 10MΩ
207a, 207d: 30KΩ
207b, 207c: 2KΩ
215, 220, 225, 232, 233, 242, 243, 244: 10KΩ
222, 226, 236, 246, 249: 22Ω
229, 230, 239: 5KΩ
237, 248: 1KΩ
238, 245: 1MΩ

Capacitors 212, 213: 1μf
214: 1500 pf
216, 127, 240: 0.1 μf
219, 224, 227, 228, 235, 247, 250: 0.01μf
223: 30pf

Anode Current Regulator

Integrated Circuits 164, 165: Harris Semiconductor HA2900-8

Transistors 134, 152: Siliconix, Inc. M119

Diodes 132, 153: 1N981
137, 138, 146, 147: 1N914
142: 1N4578

Resistors 130, 139: 2.13 KΩ
140: 4.3 KΩ
143, 144: 100KΩ

Capacitors 133, 145: 1500pf
135, 136, 145, 149, 150: 0.1μf

Anode Interface Circuit

Diodes 156, 157, 161, 162: Varo, Inc. VB60

Resistors 154, 158: 100KΩ
155: nominal select, value chosen to balance voltage across FET transistors 134 and 152
159, 160: 40 MΩ

PZT Drive Circuit

Transistors 103, 108: Semiconductor Technology Co. TRSP50155

Diode

106: 1N914

Resistors

102: 12KΩ
104: 47KΩ
105: 270 KΩ
107, 109: 10KΩ
110: 180 KΩ

Capacitor

101: 0.01 μf

What is claimed is:

1. In combination:
a laser gyroscope cavity having a closed path for propagation of a plurality of waves, each of said waves being of a different frequency;
at least two detecting means, at least two of said waves being coupled to each of said detecting means; and
first and second filtering means being coupled to each of said detecting means, said first filtering means having a passband below a predetermined frequency and said second filtering means having a passband above said predetermined frequency, said predetermined frequency being below the minimum output signal frequency from said second filtering means produced by rotation of said laser gyroscope cavity, and substantially all the signal power from each of said detecting means of a frequency below said predetermined frequency flowing to the corresponding first filtering means and substantially all the signal power from each of said detecting means of a frequency above said predetermined frequency flowing to the corresponding second filtering means.

2. The combination of claim 1 further comprising:
means for adjusting the length of said closed path in response to at least one output of said first filtering means.

3. The combination of claim 2 wherein said adjusting means comprises:
a piezoelectric transducer.

4. The combination of claim 1 wherein each of said filtering means comprises:
amplifying means.

5. The combination of claim 4 further comprising:
means for producing a count in response to at least an output of said second filtering means.

6. In combination:
a laser gyroscope cavity having a closed path for propagation of at least four waves, each of said waves being of a different frequency;
first and second detecting means, a first two of said waves being coupled to said first detecting means and a second two of said waves being coupled to said second detecting means;
first and second signal filtering means being coupled to each of said detecting means, said first signal filtering means having a passband below a predetermined frequency and said second signal filtering means having a passband above said predetermined frequency, said predetermined frequency being below the minimum output signal frequency from said second filtering means produced by rotation of said laser gyroscope cavity, and substantially all the signal power from each of said detecting means of a frequency below said predetermined frequency flowing to the corresponding first filtering means and substantially all the signal power of a frequency above said predetermined frequency flowing to the corresponding second filtering means.

means for adjusting the length of said closed path in response to outputs of said first filtering means coupled to said first and second detecting means; and means for producing an output signal indicative of rotation of said laser gyroscope in response to outputs of said second filtering means coupled to said first and second detecting means.

7. The combination of claim 6 wherein said first and second filtering means each comprise:
amplifying means.

8. The combination of claim 7 wherein said path length adjusting means comprises:
means for producing a signal representative of the difference in amplitude between the output of said first filtering means coupled to said first detecting means and said first filtering means coupled to said second detecting means;
means for positioning reflecting means disposed in said path in response to said signal representing said difference.

9. The combination of claim 8 wherein said positioning means comprises:
a piezoelectric transducer.

10. The combination of claim 6 wherein said means for producing an output signal indicative of rotation of said laser gyroscope comprises:
means for producing a first pulse stream in response to the output of said second filtering means coupled to said first detecting means; and
means for producing a second pulse stream in response to the output of said second filtering means coupled to said second detecting means.

11. The combination of claim 10 wherein said means for producing a first pulse stream and said means for producing a second pulse stream each comprise:
amplifying means; and
Schmitt trigger means coupled to said amplifying means.

12. The combination of claim 11 further comprising:
means for producing a count output in response to the difference in frequency between pulses in said first and second pulse streams.

13. The combination of claim 1 wherein:
the input impedance of said first filtering means is lower than that of said second filtering means for signals of a frequency below said predetermined frequency and higher than that of said second filtering means for signals of a frequency above said predetermined frequency.

14. The combination of claim 6 wherein:
the input impedance of said first filtering means is lower than that of said second filtering means for signals of a frequency below said predetermined frequency and higher than that of said second filtering means for signals of a frequency above said predetermined frequency.

* * * * *